Oct. 6, 1925.

W. P. CUNNINGHAM

SAFETY C LINK

Filed Jan. 21, 1925

1,556,428

Inventor
W. P. Cunningham.

By Townshend & Townshend
Attorney

Patented Oct. 6, 1925.

1,556,428

UNITED STATES PATENT OFFICE.

WINTFORD P. CUNNINGHAM, OF TULSA, OKLAHOMA.

SAFETY C LINK.

Application filed January 21, 1925. Serial No. 3,817.

*To all whom it may concern:*

Be it known that I, WINTFORD P. CUNNINGHAM, a citizen of the United States, residing at Tulsa, in the county of Tulsa and State of Oklahoma, have invented certain new and useful Improvements in Safety C Links, of which the following is a specification.

My invention relates to connectors adapted for use in hoisting tackles and chains.

The primary object of the invention is to provide a novel and improved system of links, provided with safety latch means.

Another object of my invention is to provide a novel and improved system of safety links to be used in connection with hoisting chains.

With these and such other objects in view as may be apparent from the description the invention resides in the novel combination, construction and arrangement of parts hereinafter described and claimed and illustrated in the accompanying drawings of which:—

Figure 1:
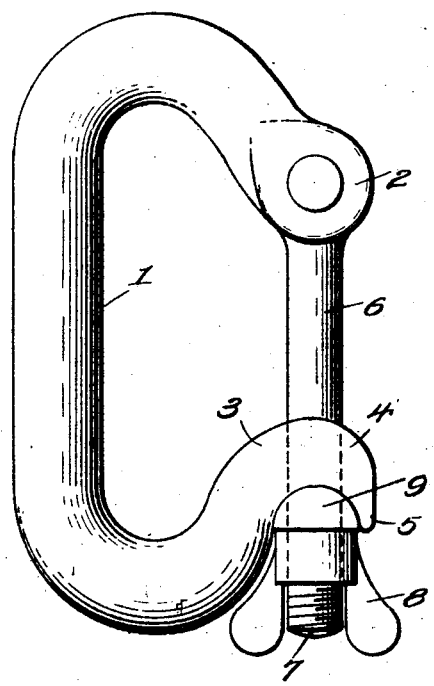
Figure 2:
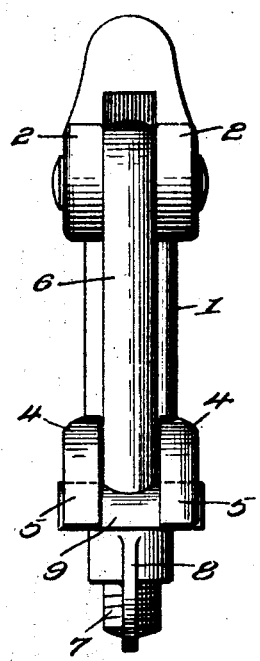
Figure 3:
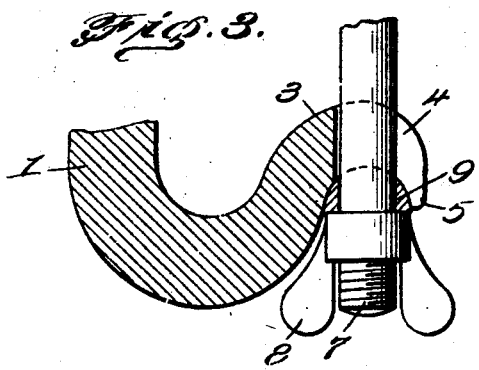

Figure 1 is a side elevation of a link constructed in accordance with the principles of the invention, Figure 2 is an edge view thereof, and Figure 3 is a fragmentary sectional view of the lower latching portion of the link.

In detail the invention comprises a substantially C-shaped link 1, one terminal of which is provided with spaced ears 2, and the other terminal 3 of which is provided with a bill in the form of forked arms 4 extending towards the ears 2 and terminating in section 5. Pivoted between the ears 2 is an eye bolt 6, of a sufficient length to extend beyond the opposite end of the link and adapted to enter between the forked arms 4. The free end 7 of the bolt shank 6 is threaded to receive thereover a wing nut 8 which is adapted to clamp a semi-cylindrical washer 9 up under the bill 4 and behind the beak 5 serving to lock the bolt in closed position.

The washer 9 is of semi-cylindrical formation and is provided with a central bore for reception over the end of the bolt shank. The washer is of a sufficient length to extend at each side slightly beyond the beak 5, whereby the swinging end of the eye bolt will be securely anchored in position when it is desired to close the link.

While in this preferred form of the invention I have illustrated and described certain details which enter into the construction and operation thereof, I desire it to be understood that the invention is not to be limited thereby, but that any desired changes and modifications may be made in the details as will fall within the scope of the invention as claimed.

I claim:—

1. A safety latch comprising a U-shaped link member, one terminal thereof being formed with a bifurcated bill having beaks extending therefrom, an eye bolt pivoted in the opposite terminal of said link and adapted to be swung into engagement with said bill, a wing nut disposed over the free end of said eye bolt, and a semi-cylindrical washer disposed over the free end of said bolt and adapted to be clamped by said wing nut under the bill and behind said beak.

2. A safety link comprising an open sided link, one terminal thereof being curved and bifurcated, a closure member therefor pivoted in the opposite terminal and having a portion adapted to engage in the bifurcated terminal, a washer disposed over the free end of said member and formed to the configuration of said curved bifurcated terminal, and means on the free end of said member for retaining said washer in the curve of said terminal to lock said closure member in link closing position.

In testimony whereof I affix my signature.

WINTFORD P. CUNNINGHAM.